C. E. BAUERMEISTER.
SALT SHAKER.
APPLICATION FILED OCT. 7, 1911.
1,028,663.
Patented June 4, 1912.
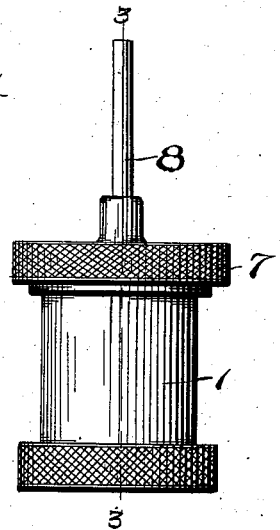
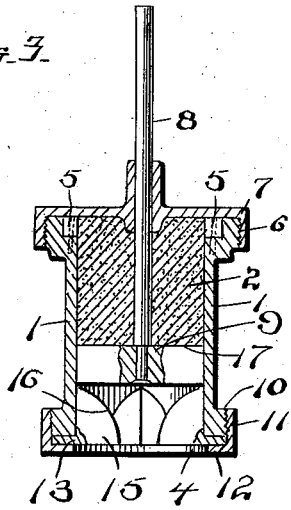
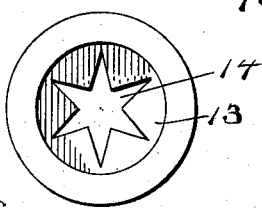
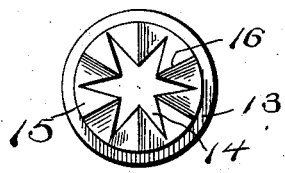
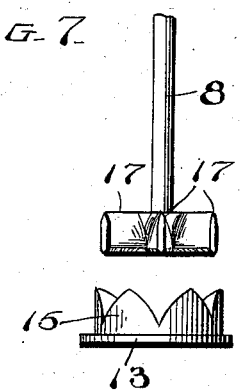
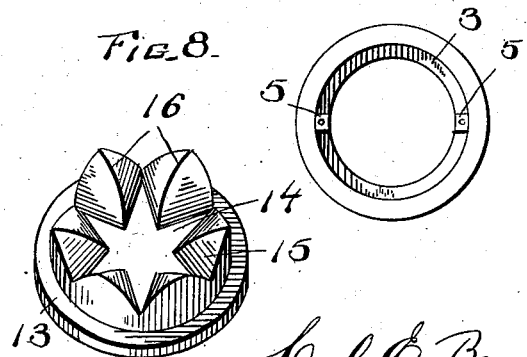
Witnesses
R. S. Trogner
A. L. Kitchin
Inventor
Carl E. Bauermeister
By Mason Fenwick Lawrence
his Attorneys

UNITED STATES PATENT OFFICE.

CARL ESSLINGER BAUERMEISTER, OF TERRE HAUTE, INDIANA.

SALT-SHAKER.

1,028,663.  Specification of Letters Patent.  Patented June 4, 1912.

Application filed October 7, 1911. Serial No. 653,305.

*To all whom it may concern:*

Be it known that I, CARL E. BAUERMEISTER, a citizen of the United States, residing at Terre Haute, in the county of Vigo and State of Indiana, have invented certain new and useful Improvements in Salt-Shakers; and I do hereby declare the following to be a full, clear, and exact description of the invention, such as will enable others skilled in the art to which it appertains to make and use the same.

This invention relates to improvements in salt shakers, and has for an object the arrangement of improved means for distributing salt after removing the same from a cake or lump.

Another object of the invention is the arrangement of an improved shaker formed with a reciprocating and movable member designed to shave salt from a cake when it is desired to dispense the salt, and designed to close the shaker when the dispensing of salt is not desired.

With these and other objects in view the invention comprises certain novel constructions, combinations, and arrangement of parts as will be hereinafter more fully described and claimed.

In the accompanying drawings: Figure 1 is a side view of an embodiment of the invention. Fig. 2 is a bottom plan view of the structure shown in Fig. 1. Fig. 3 is a section through Fig. 2 on line 3—3. Fig. 4 is a top plan view of the interior of the bottom cap after the same has been removed. Fig. 5 is a view similar to Fig. 4 but with the salt distributing plunger arranged in position. Fig. 6 is a top plan view of the casing. Fig. 7 is a side view of the lower cap and plunger, the same being shown slightly separated. Fig. 8 is a perspective view of the cap.

Referring to the accompanying drawings by numerals, 1 indicates a cylindrical housing in which is positioned a cake of salt 2 which is any desired quality of salt compressed or provided in a solid or crystallized structure. The cake 2 is formed with a flange which fits in the offset portion 3 (Fig. 6) of housing 1 for preventing the salt from moving down toward the lower end cap 4. In order to prevent the salt from rotating lugs or extensions 5 are provided in the offset portion 3. The upper end of housing 1 is threaded at 6 for receiving a cap 7 formed with an aperture arranged centrally thereof which accommodates shaft 8 of the salt distributing plunger 9. At the opposite end of cap 7 housing 1 is threaded at 10 for receiving a binding nut 11 formed with a turned over annular portion 12 which engages the flange 13 of the end cap 4. End cap 4 is formed with an opening 14 which may be of any desired configuration, that shown being in the form of a six pointed star. The opening 14 gradually enlarges until the same merges into the cylindrical opening of the interior of housing 1. As seen from Figs. 3 and 8 this arrangement defines lugs 15 which have their points 16 formed arc shaped and extend from near the center of the opening 14 to the upper periphery of the end cap 4. The sides of the lugs 15 are consequently all beveled, and slant toward some part of opening 14, so that any salt falling from cake 2 will either fall directly through the opening 14 or engage the sides of lugs 15, and from thence fall through opening 14.

In order to provide means for sealing cap 4 against the entrance of air and moisture, and at the same time provide means for removing or shaving salt from the cake 2, the plunger 9 is provided which is shown formed as a six pointed star for corresponding with opening 14. The lower edge or bottom of the star is designed to fit into the star shaped opening 14 for sealing the same when no salt is desired. The upper edge of the plunger 9 is formed with a knife edge 17 which is designed to be pulled up against the cake 2 by shaft 8, and then rotated for shaving or removing some of the salt. After a sufficient quantity of salt has been removed shaft 8 is released and the plunger drops automatically into position for closing the opening 14. In case the plunger should not drop directly into opening 14 the same will slide off the sides of lugs 15, and eventually occupy its proper position.

What I claim is:

1. In a salt shaker, a housing designed to receive a cake of salt, a shaft arranged in said housing and projecting therefrom, a plunger rigidly connected with said shaft formed with a knife edge on its upper surface, and a cap for said housing formed with an opening of substantially the same shape as said plunger, and adapted to be closed by said plunger.

2. In a salt shaker of the class described, a housing adapted to receive a cake of salt, a plunger arranged in said housing formed with knives on its upper edge for engaging said salt and removing the particles therefrom when rotated, means for rotating said plunger, a closure for one end of said housing formed with a body portion, and a plurality of lugs extending therefrom radially toward the center but falling short of the center, whereby an aperture is defined, said lugs being of such a shape as to define an aperture of such size and shape as to be closed by said plunger, and a clamping member arranged to clamp said end closure in place.

3. In a salt shaker of the class described, a housing designed to receive a cake of salt, means for preventing said salt from rotating, an upper cap formed with an aperture therein, a shaft projecting through said upper cap and through said cake of salt, a plunger rigidly connected with said shaft formed with a knife edge on its upper surface, and a lower cap for said housing formed with an opening of substantially the same shape as said plunger and adapted to be closed by said plunger.

4. In a salt shaker of the class described, a housing adapted to receive a cake of salt, means for preventing the rotation of said cake of salt, a plunger formed with knives on the upper edge for engaging said cake of salt and removing particles therefrom when rotated, means for rotating said plunger, and a cap formed with an aperture therein for receiving and distributing the salt removed from said cake, said cap comprising a body portion and a plurality of lugs, the space between said lugs forming said aperture and accommodating the lower edge of said plunger, the lower edge of said plunger being adapted to close said aperture.

5. In a salt shaker of the class described, a housing adapted to receive a cake of salt, a substantially star shaped plunger arranged in said housing formed with knife edges on the upper side, means for moving said plunger against said cake of salt and then rotating the same for removing particles of salt, and a cap arranged below said plunger, said cap being formed with a star shaped opening, said opening flaring outwardly from the lower edge to the upper edge of said cap and accommodating the lower edge of said plunger for being closed thereby and for receiving and distributing particles of salt removed by said plunger.

In testimony whereof I affix my signature in presence of two witnesses.

CARL ESSLINGER BAUERMEISTER.

Witnesses:
HARRY B. SHIELDS,
WM. O. ELLIOTT.